(12) United States Patent
Watano et al.

(10) Patent No.: US 6,197,369 B1
(45) Date of Patent: Mar. 6, 2001

(54) METHOD OF PARTICLE COATING

(75) Inventors: Satoru Watano, Osaka (JP); Robert Pfeffer, Teaneck; Rajesh N. Dave, Wayne, both of NJ (US)

(73) Assignee: New Jersey Institute of Technology, Newark, NJ (US)

( * ) Notice: Subject to any disclaimer, the term of this patent is extended or adjusted under 35 U.S.C. 154(b) by 0 days.

(21) Appl. No.: 09/409,137

(22) Filed: Sep. 30, 1999

(51) Int. Cl.[7] .............. B05D 1/24; B05D 3/04; B05D 3/12

(52) U.S. Cl. .......... 427/213; 427/180; 427/185; 427/212; 427/240; 427/242

(58) Field of Search .............. 427/2.15, 2.18, 427/185, 180, 213, 212, 240, 242; 118/DIG. 5

(56) References Cited

U.S. PATENT DOCUMENTS

| | | | |
|---|---|---|---|
| 4,788,080 | * 11/1988 | Hojo et al. | 427/204 |
| 4,915,987 | * 4/1990 | Nara et al. | 427/180 |
| 5,372,845 | * 12/1994 | Rangaswamy et al. | 427/216 |
| 5,374,405 | * 12/1994 | Firnberg et al. | 422/186.3 |
| 5,505,990 | * 4/1996 | Sagawa et al. | 427/184 |

* cited by examiner

*Primary Examiner*—Shrive Beck
*Assistant Examiner*—Michael Barr
(74) *Attorney, Agent, or Firm*—Goodwin, Procter Hoar LLP

(57) ABSTRACT

Coater for coating particles is provided with a casing and a cylinder having apertures rotatably mounted within the casing. Gas is blown into the casing and onto the host particles through the slots of the cylinder. Guest particles may be inserted into the casing initially or subsequently after rotation of the cylinder begins. The particles are fluidized when a balance is attained between the centrifugal force from the rotation of the cylinder and the force exerted upon the particles from the air flow. The centrifugal force exerted on the particles within the cylinder in an operating state is at least about 25 gs so as to cause guest particles of different sizes to be coated onto the host.

7 Claims, 6 Drawing Sheets

METHOD OF PARTICLE COATING

FIELD OF INVENTION

The present invention relates to a rotating fluidized bed coater and, more particularly, to a rotating fluidized bed coater for coating fine or guest particles onto core or host particles.

BACKGROUND OF THE INVENTION

In many manufacturing processes, particularly in the food, drug and cosmetics industries, there is a need to put a coating on, or otherwise modify the surface of host substances (e.g. particles) for a particular purpose. Such coatings can be applied in conventional fluidized beds which typically have porous bottoms with gas flowing upwardly therethrough. When the drag force of the gas on the particles is exactly balanced by the gravity force, the particles lift and form a fluidized bed. The velocity at which the bed becomes fluidized is called the minimum fluidization velocity. In rotating fluidized beds, one can fluidize very fine particles which cannot be fluidized in conventional beds. Another major advantage of rotating vs. conventional fluidized beds is that higher amounts of gas can be passed through in a rotating bed as the effective force on the particles is greater due to the high centrifugal force.

Coating of powders can be accomplished by either "wet" or "dry" methods. Typically, dry methods to synthesize composite materials use some grinding systems. In such methods, core particles are coated using fine particles by subjecting the mixture to large shearing and compressive stress or high impact forces. Various scientists have studied dry coating methods to synthesize composite materials using a high shear mill called Mechnofusion. Some have have analyzed the dry coating process using a dry impaction blending method referred to as a Hybridizer. Others have developed a horizontal high shear mill (Theta composer) for the particle dry coating. In all of these devices, the high shear stress or impaction force may determine the depth to which the guest particles are embedded into the surface of the host particles. The local temperature rise due to these strong forces may also play a role in determining the coating strength.

Granulators and coaters must be distinguished. A coater is used in coating of relatively fine (guest) particles onto relatively large core (host) particles to create new material with new functionality or to improve the characteristics of known materials. For instance, the guests may be 1–5% in size compared to the hosts. By contrast, a granulator does not involve the addition of a guest particle, but the enlarging and rounding of small, irregularly-shaped particles. The granulated particle may grow to several times the size it was in its ungranulated state.

Wet granulation processes typically use a binder such as water, sugar solution, starch, various polymers, etc. The "wet" methods used for coating, require spraying a solvent or a suspension onto the powdery particles. Dry methods are thus preferred because they do not require the use of solvents and are therefore environmentally friendlier.

A device for coating powders is disclosed in Japanese Patent Laid-Open Publication No. 7-299348. The coating device includes a rotary member having a plurality of air supply holes, a plurality of agitating blades and a container having a powder supply hole. The powder is supplied into the container through the powder supply hole positioned above the rotary member toward the rotary member. A fluidization (in hybridization, there is no fluidization; rather pneumatic transport) is made in such a manner that the rotary member and the agitating blades are rotated, with air supply being made through the air supply holes and the powder is supplied from the powder supply hole.

It is therefore an object of the invention to provide an efficient and economical rotating fluidized bed coater which:

(a) works on lower levels of normal and shear stresses as compared to a hybridizer and mechanofusion;

(b) produces less heat hence has lower operating temperature, yet, by changing the temperature of the incoming gas stream, the process temperature may be controlled;

(c) allows the gas stream to carry another substance, for example moisture, mist of another liquid, or even another dispersed powder material, thus allowing better possibility for creating advanced composite powders;

(d) can be easily operated as a continuous operating device, thus does not have the limitation of a "batch" process;

(e) because of some of the above advantages may be more easily applicable to pharmaceutical and other "delicate" applications;

(f) allows air, inert gas or reactive gas (including reducing or oxidizing type), to be the fluidizing medium, depending on the need and/or application;

(g) is less likely to cause contamination of the powder material as compared to devices with higher stresses (e.g. hybridizer and mechanofusion); and (h) provides improved material properties such as flowability, dispersability, coloring, flavor/taste, etc and improved chemical reaction functions; as well as (i) allows for the creating of discrete, as well as continuous or film type coatings.

SUMMARY OF THE INVENTION

The above and other objects of the invention are accomplished by providing a rotating fluidized bed coater for coating powdery particles. The coater comprises a casing, a cylinder mounted within said casing and rotatable around its axis of symmetry. The cylinder has a wall defined along a circumference thereof on which the powdery particles are positioned and a plurality of openings formed through the wall. A gas supply tube through which gas flows is directed into the casing. The gas from the gas supply tube is applied on the powdery articles through the openings.

In operation, powdery particles to be processed are positioned within the cylinder. When the cylinder starts to rotate, the particles are forced to the wall of the cylinder by the centrifugal force from the rotation. At the same time, gas flows radially inward into the casing through the tube and applied on the powdery particles via the plurality of openings in the cylinder. Thus, the particles are fluidized by the balance of the centrifugal force and the driving force of the air flow.

BRIEF DESCRIPTION OF THE DRAWINGS

The invention will become more apparent from the Detailed Description of the Preferred Embodiment, when reviewed with reference to the accompanying drawings, in which.

DETAILED DESCRIPTION OF THE PREFERRED EMBODIMENTS

Dry particle coating involves mechanically fixing fine particles (guests) onto the surface of relatively large particles (hosts) to create new materials with new functionality or improve characteristics of known materials. Typically, the size of the guest particles are much smaller then the host particles; for instance, the guests may be 1–5% in size compared to the host.

Figure 1:
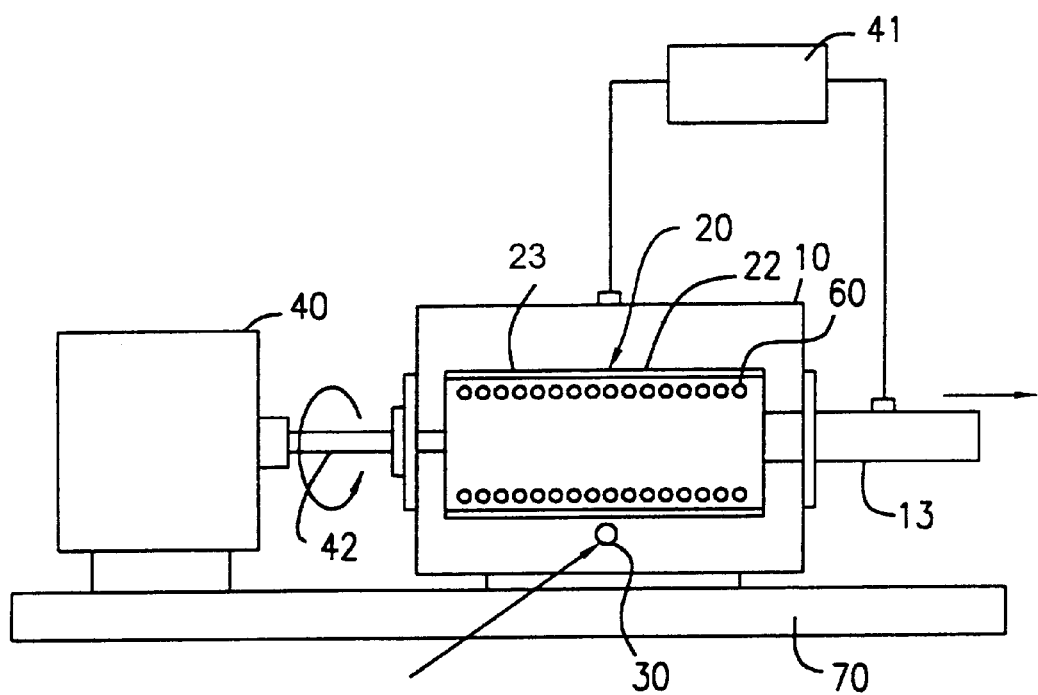
FIG. 1 illustrates a schematic longitudinal sectional view of rotating fluidized bed coater for carrying out the invention.
Figure 2:
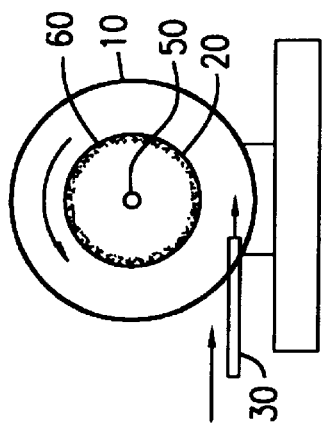
FIG. 2 depicts a schematic cross-sectional view of a casing of the inventive rotating fluidized bed coater.

One preferred embodiment of the inventive process carried out in a rotating fluidized bed coater is now described with reference to the drawings. Referring to FIG. 1, the inventive rotating fluidized bed coater includes a casing 10, a driving motor 40 and a pressure sensor such as a manometer 41. The manometer 41 serves to detect pressure difference between the casing 10 and the exhaust tube 13. Optionally, a flow meter (not shown) may be used to measure the gas flow rate. The casing 10, fixed on base 70, is provided with a preferably horizontal sintered metallic cylinder 20. The cylinder 20 is a key element of the present invention and is rotatably mounted around an axis of symmetry 42 within the casing 10. The cylinder 20 is defined by a wall 23 and a plurality of apertures or slots 22 formed through the wall. The slots 22 may be elongated shapes or other shapes according to the results desired.

Figure 3:
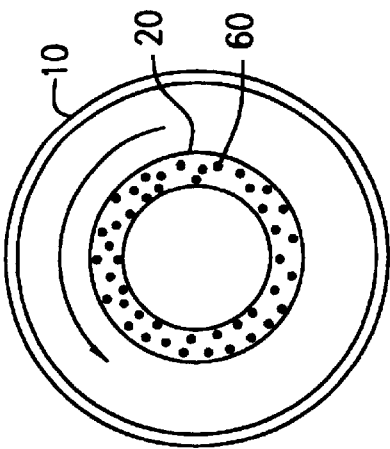
FIG. 3 is a cross-sectional view of the rotating fluidized bed coater showing how these particles are positioned within the cylinder.

Host particles 60 to be coated, as shown in FIG. 3, are deposited on the cylinder wall 23. In actual operation, guest particles may be blown in or the guest and host particles may be initially mixed together. The high centrifugal forces from the rotation of the cylinder 20 causes particles 60 to be moved toward the wall. By having such rotating fluidized bed, unlike conventional beds, one can fluidize very fine particles that cannot be fluidized in conventional beds.

Air flow at a predetermined flow rate is introduced into the casing 10 by a gas supply tube 30 equipped with a flow control unit (not shown). One can control the process temperature by changing the temperature of the incoming gas stream. The gas stream may carry another substance, for example moisture, mist of another liquid, or even another dispersed powder material, thus allowing better possibility for creating advanced composite powders. Further, the fluidized medium can be air, inert gas or reactive gas, including the reducing or oxidizing type, depending on the need and/or application.

However, in some instances where the apertures are relatively large, a screen/mesh may be positioned inside the distributor. Various types of distributors may be used made of for instance, of stainless steel (for pharmaceutical application) sintered metal, sintered ceramics or perforated plate. Accordingly, the particles 60 within the cylinder 20 can be fluidized or agitated by the air introduced through slots 22 or perforations in the sintered metal.

Figure 4:
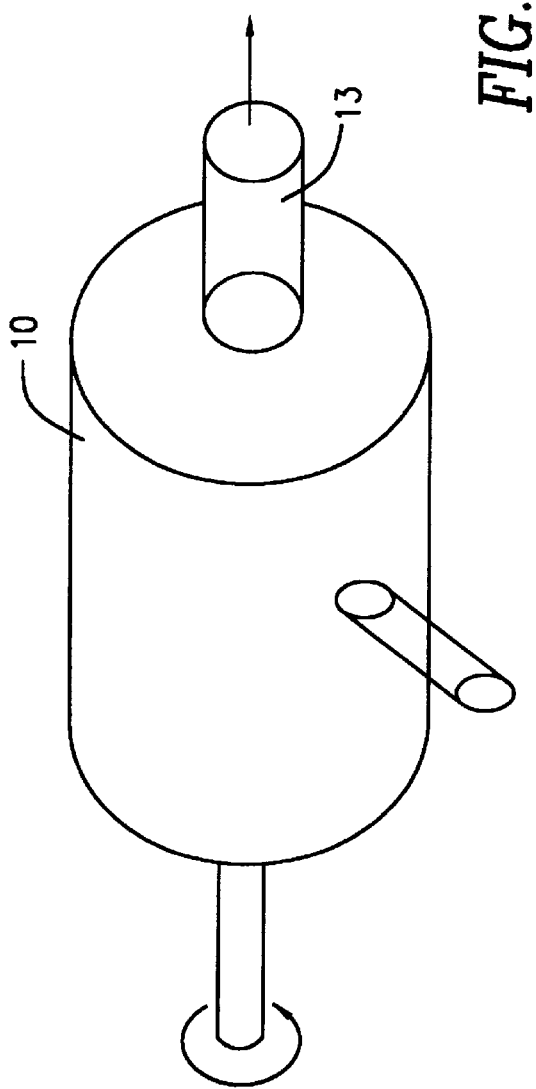
FIG. 4 is a schematic view of the rotating fluidized bed coater showing the relative position of an exhaust tube.

Air or other gases flow radially inward through the porous cylinder and at sufficiently high flow rate so that when the drag forces on the particles balance the centrifugal forces, the bed fluidizes. FIG. 4 schematically shows the rotating fluidized bed and the relative position of the exhaust tube through which the introduced air is exhausted to an atmosphere.

Both a dry coating wherein any solution or suspension is not required, and the wet coating wherein the liquid is required can be performed with the present invention. For the wet coating, the binding liquid is sprayed from the spray nozzle 50 during the fluidization of the powdery particles 60. The spray nozzle 50 is mounted at the center of the cylinder 20.

The operation of the inventive rotating fluidized bed coater will now be described with the reference to the drawings. At a rest state of the cylinder 20, particles 60 to be processed are positioned within the cylinder 20. When the cylinder 20 starts to rotate by the driving motor 40, the particles 60 are forced to the wall member 23 due to centrifugal force from the rotation of the cylinder 20. At the same time, gas flows radially inward into the casing 2 through the air supply tube 30. The air flow from the air supply tube 30 is applied on to the particles 60 via the plurality of slots 22. In other words, the particles 60 are fluidized by the balance of the centrifugal force on the particles and the driving forces thereon from the applied gas flow. The centrifugal force causes the particles 60 to form a layer at the wall 23 through which fluidization occurs.

Figure 5:
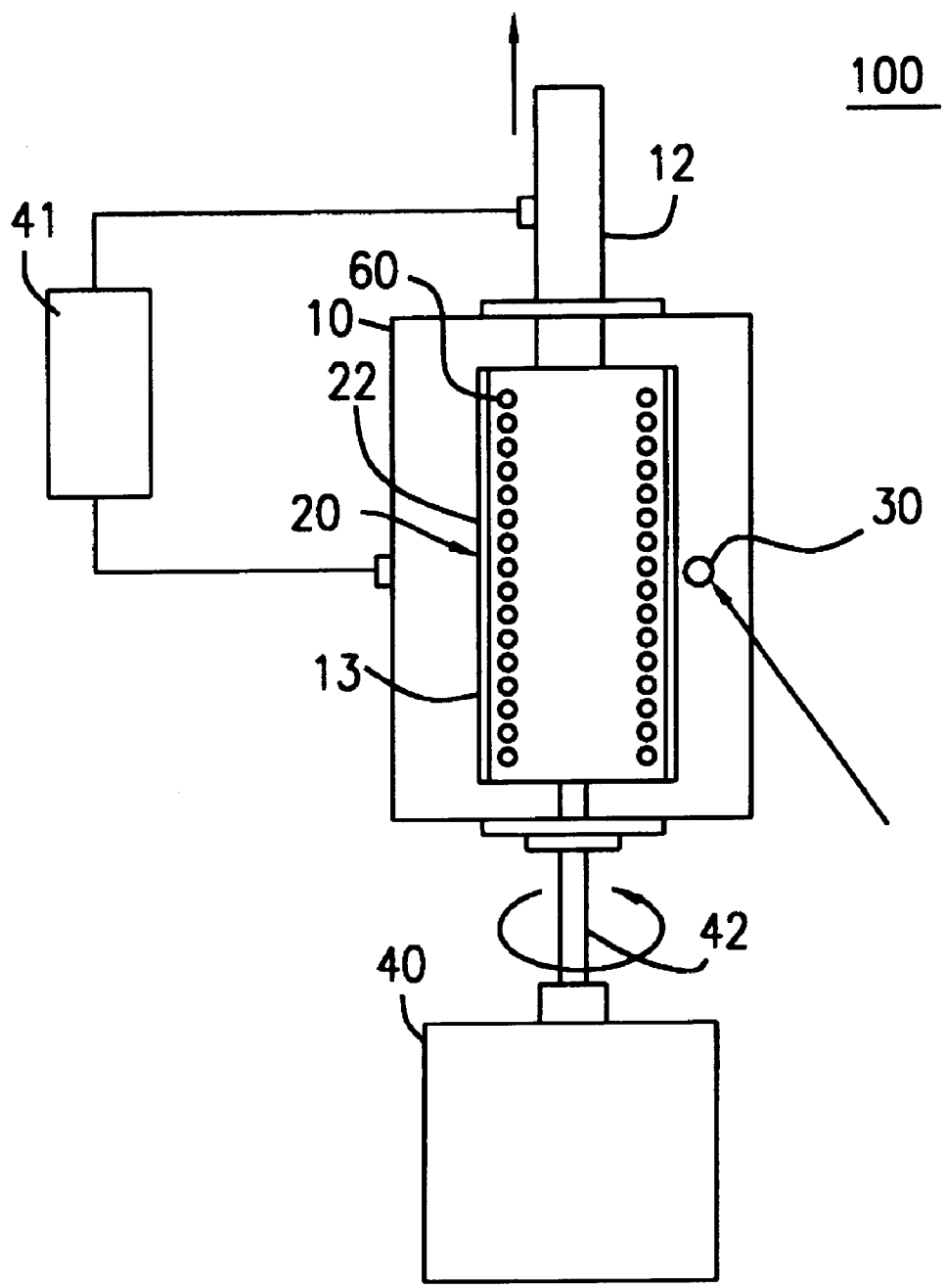
FIG. 5 is the rotating fluidized bed coater shown in a vertical orientation for continuous processing using the aid of gravity for feeding the particles.

It should be further appreciated that the cylinder 20 and casing 10 may be oriented vertically rather than horizontally for continuous, rather than batch-wise processing, using the aid of gravity for feeding the particles as shown in the unit of FIG. 5.

Figure 6:
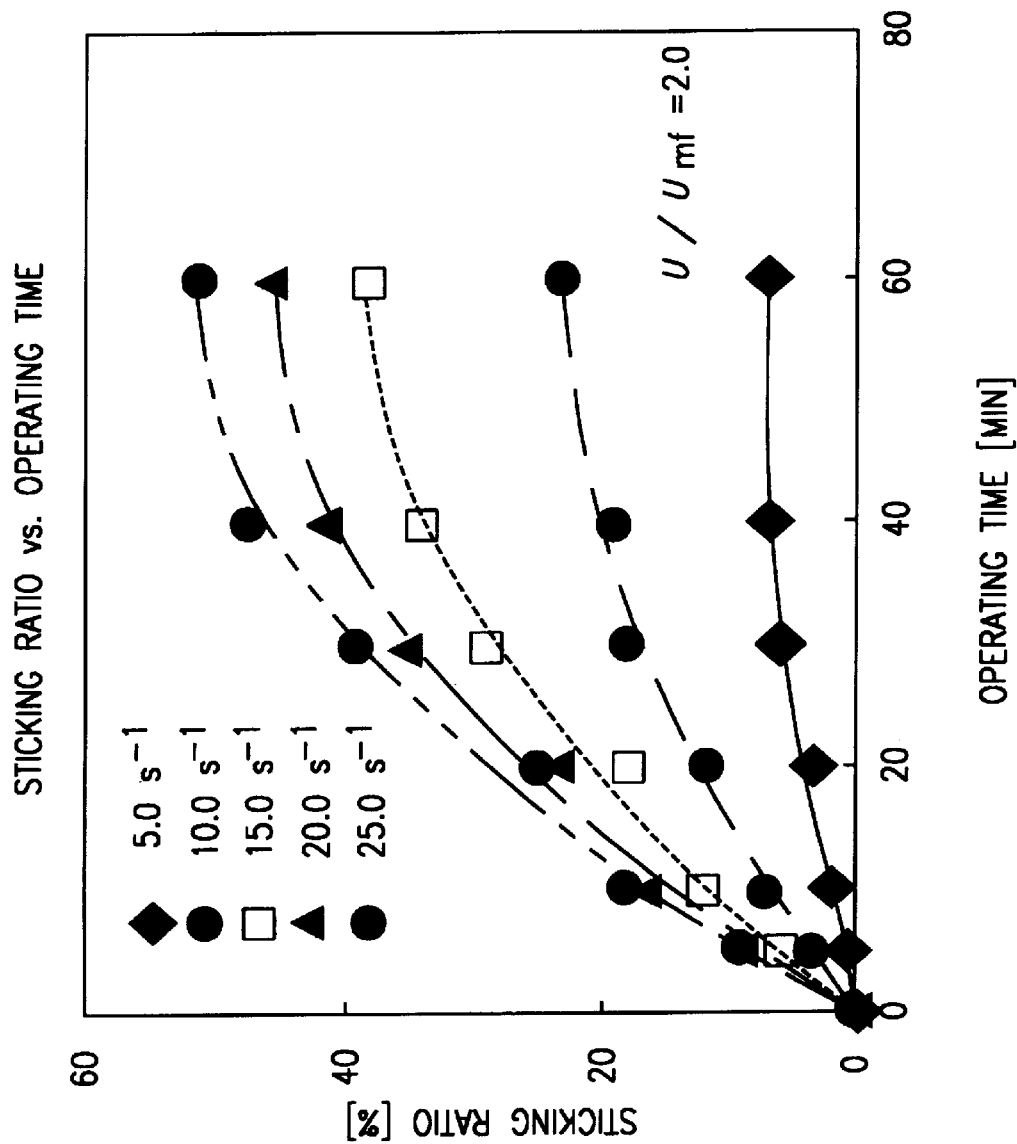
FIG. 6 is a plot of the sticking ratios against operating time for an experiment conducted using PMMA as a host particle and fine $Al_2O_3$ as guest particles.

Experimentation has been conducted using various host and guest particles. In one experiment by applicants, $0.7\mu$ ($200\mu$) polymetylrmethacrylate (PMMA) particles were used as the "host" particles and fine $Al_2O_3$ particles as the guests. After coating, the coated products were weighed. Yield of the products was measured using the mass of particles before and after the coating. 10 g of the coated products were fed into a mesh basket ($\phi$15 mm×20 mm, mesh opening is 75 $\mu$m) and sank into a water bath, subjecting to an ultrasonic vibration for a minute. After removing loosely attached particles, the coated products were dissolved into an acetone. Since PMMA particles dissolve into acetone, $Al_2O_3$ particles could be separated from PMMA completely by using an ultra fine filter (pore size is 0.02 $\mu$m). Sticking ratio was then calculated using mass of $Al_2O_3$ on PMMA particles before and after an ultrasonic test. FIG. 6 is a plot of the sticking ratio against the operating time. Most of the fine $Al_2O_3$ at the lowest rotational speed (N-5.0 s$^{-1}$) were washed away by the ultrasonic vibration. This implied that most of the fine $Al_2O_3$ particles were stuck very loosely onto the PMMA particles just as in an ordered mixture. Because of the furious agitation, particles collide with each other intensely inside the bed, resulting in the firm coating of fine $Al_2O_3$ onto the PMMA particles. In operation, the cylinder 20 of the rotating fluidized bed coater preferably rotates at about 1,000 rpm or faster—exerting a centrifugal force on the particles of about 25 gs i.e., 25 times the gravitational force) or higher.

Figure 7:
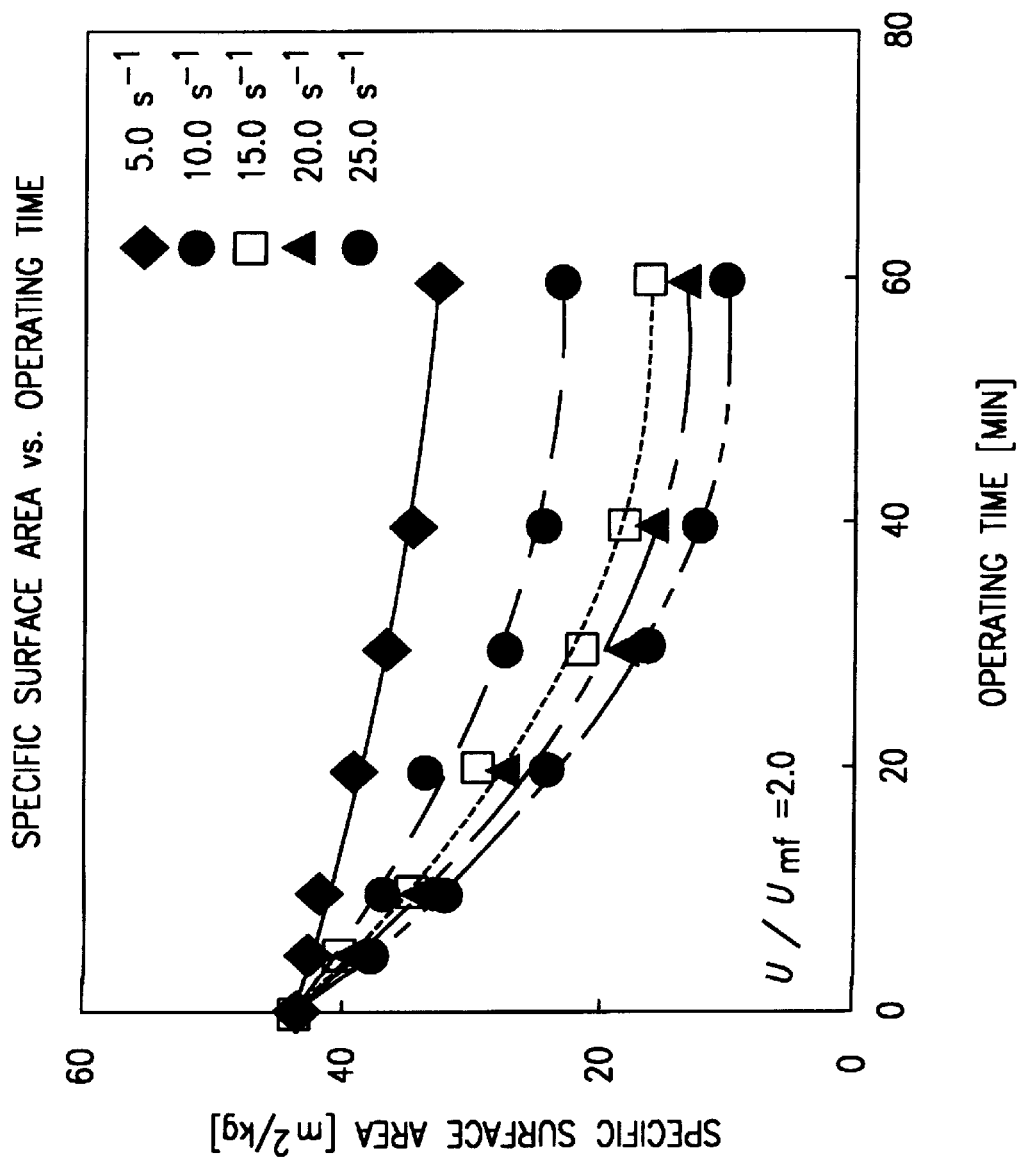
FIG. 7 is a plot of the specific surface area against the operating time for the same experiment.
Figure 8:
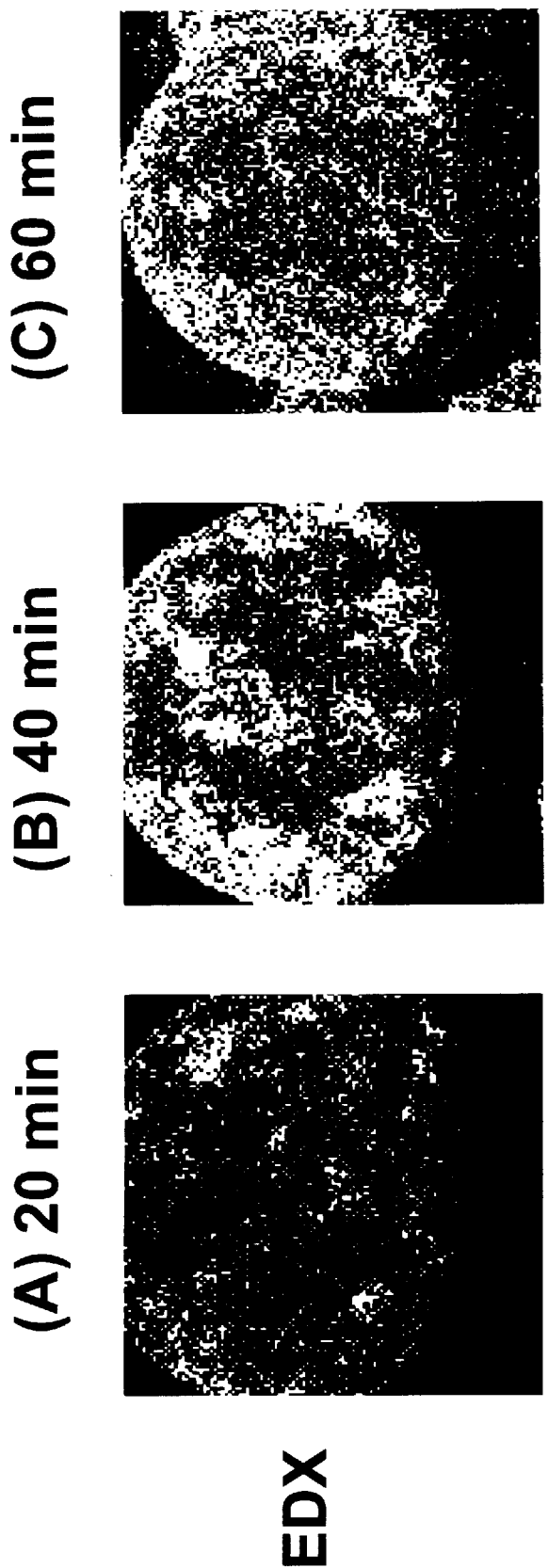
FIGS. 8(a)–(c) show an increase in surface coverage at different time intervals as a function of processing time.

In this study, 30 g of PMMA and 1.5 g of $Al_2O_3$ (5 wt %) were used for the experiments. FIG. 7 is a plot of the specific surface area against the operating time. With the increase in rotational speed and operating time, the surface area decreased substantially. These data also implied that the coating of fine particles were taking place in the rotating fluidized bed coater. Specific surface area was measured using a BET method. Dispersion of $Al_2O_3$ on the surface of PMMA particles was analyzed by an EDX (Energy dispersive X-ray spectrometer). FIGS. 8 (a)–(c) show an increase in surface coverage at different time intervals as a function of processing time.

Although the inventive process has been described, it will be understood by those skilled in the art that various changes and modifications be made without departing from the scope of the invention as defined in the following claims.

What is claimed is:

1. A method of coating host particles, said method comprising the steps of:

providing a cylinder mounted within a casing, said cylinder being rotatable around its axis of symmetry, wherein centrifugal force exerted on said particles within said cylinder in an operating state is at least about 25 gs, said cylinder having a wall defined along a circumference thereof and a plurality of openings formed therethrough;

providing host particles within the cylinder;

providing guest particles within the cylinder;

rotating said cylinder around its axis of symmetry; and injecting gas into said casing from a gas supply tube, said gas being applied on said particles through said openings, so as to fluidize said particles, wherein centrifugal force exerted on said particles within said cylinder in an operating state is at least about 25 gs, such that said host particles are coated with said guest particles.

2. The method of claim 1, wherein said step of rotating the cylinder is facilitated by a driving motor for rotating said cylinder.

3. The method of claim 2, wherein said cylinder, in the operating state, rotates at at least 1,000 rpm.

4. The method of claim 1, further providing the step of expelling the gas injected into the casing.

5. The method of claim 1, wherein the cylinder is provided with an exhaust tube; further providing the step of detecting a difference between a pressure within the casing and a pressure within the exhaust tube.

6. The method of claim 1, wherein said guest particles are inserted into said cylinder after the host particles.

7. The method of claim 1, wherein said cylinder is vertically oriented for continuous processing of the particles.

* * * * *